United States Patent
Takaya et al.

(10) Patent No.: US 12,440,097 B2
(45) Date of Patent: Oct. 14, 2025

(54) OCT DEVICE

(71) Applicant: NIDEK CO., LTD., Gamagori (JP)

(72) Inventors: Ai Takaya, Gamagori (JP); Norimasa Satake, Gamagori (JP); Yukihiro Higuchi, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 669 days.

(21) Appl. No.: 17/640,674

(22) PCT Filed: Aug. 28, 2020

(86) PCT No.: PCT/JP2020/032705
§ 371 (c)(1),
(2) Date: Mar. 4, 2022

(87) PCT Pub. No.: WO2021/044982
PCT Pub. Date: Nov. 3, 2021

(65) Prior Publication Data
US 2022/0322932 A1    Oct. 13, 2022

(30) Foreign Application Priority Data
Sep. 4, 2019 (JP) .................... 2019-161606

(51) Int. Cl.
*A61B 3/10* (2006.01)
*A61B 3/12* (2006.01)
*A61B 3/14* (2006.01)

(52) U.S. Cl.
CPC ............ *A61B 3/102* (2013.01); *A61B 3/1005* (2013.01); *A61B 3/12* (2013.01); *A61B 3/14* (2013.01)

(58) Field of Classification Search
CPC ...................................... A61B 3/102
(Continued)

(56) References Cited

U.S. PATENT DOCUMENTS 6,980,299 B1    12/2005  de Boer
7,527,378 B2 *   5/2009  Fukuma .............. A61B 3/102
                                                    351/205
(Continued)

FOREIGN PATENT DOCUMENTS

EP      3127472 A1 *  2/2017  .......... G01B 9/02091
JP      2008-501118 A  1/2008
(Continued)

OTHER PUBLICATIONS

Wojtkowski et al., "Full range complex spectral optical coherence tomography technique in eye imaging," Optics Letters, Aug. 15, 2002, vol. 27, No. 16, pp. 1415-1417.
(Continued)

*Primary Examiner* — Zachary W Wilkes
(74) *Attorney, Agent, or Firm* — Oliff PLC

(57) ABSTRACT

An OCT device includes an OCT optical system and a controller that also serves as an image processor. The controller acquires the OCT data of the fundus by processing the spectral interference signal output from the OCT optical system. In addition, the controller adjusts the position of the high accuracy region, which is the depth region where relatively high accuracy OCT data is obtained, by controlling the OCT optical system in accordance with the curvature level of the fundus image in the photographing range of the OCT data. This makes it possible to acquire good OCT data regardless of the curvature level of the fundus.

4 Claims, 5 Drawing Sheets

(58) Field of Classification Search
USPC .................................................. 351/206, 246
See application file for complete search history.

(56) References Cited

U.S. PATENT DOCUMENTS

| | | | | |
|---|---|---|---|---|
| 7,954,946 | B2* | 6/2011 | Murata | ................ G01B 9/0203 351/205 |
| 8,876,292 | B2* | 11/2014 | Satake | ..................... A61B 3/12 351/221 |
| 9,044,166 | B2* | 6/2015 | Murata | .............. G01B 9/02091 |
| 9,072,459 | B2* | 7/2015 | Higuchi | ............. G01B 9/02068 |
| 9,095,281 | B2* | 8/2015 | Sharma | ..................... G06T 7/11 |
| 9,585,555 | B2* | 3/2017 | Dziubak | ............. A61B 3/1005 |
| 10,251,551 | B2* | 4/2019 | Yamakawa | ............. A61B 3/102 |
| 10,674,905 | B2* | 6/2020 | Murata | ................ A61B 5/0066 |
| 11,883,100 | B2* | 1/2024 | Shiba | ................... A61B 3/0008 |
| 2007/0188704 | A1* | 8/2007 | Fukuma | ................. A61B 3/102 351/205 |
| 2009/0196477 | A1 | 8/2009 | Cense et al. | |
| 2010/0007848 | A1* | 1/2010 | Murata | ............. G01B 9/02064 356/450 |
| 2011/0176111 | A1 | 7/2011 | Taki et al. | |
| 2012/0281235 | A1* | 11/2012 | Murata | ................. A61B 3/102 356/479 |
| 2013/0208240 | A1* | 8/2013 | Sharma | ..................... G06T 7/11 356/479 |
| 2013/0242258 | A1* | 9/2013 | Higuchi | ............. G01B 9/02063 351/206 |
| 2014/0009738 | A1* | 1/2014 | Satake | ..................... A61B 3/14 351/206 |
| 2015/0305617 | A1 | 10/2015 | Tachikawa et al. | |
| 2016/0007847 | A1* | 1/2016 | Dziubak | ............... A61B 3/1225 351/246 |
| 2016/0302664 | A1* | 10/2016 | Yamakawa | ............ A61B 3/102 |
| 2018/0289256 | A1* | 10/2018 | Murata | ................ A61B 3/1225 |
| 2018/0353063 | A1* | 12/2018 | Uji | ............................ A61B 3/14 |
| 2021/0093186 | A1* | 4/2021 | Shiba | ..................... A61B 3/102 |

FOREIGN PATENT DOCUMENTS

| | | |
|---|---|---|
| JP | 2010-029648 A | 2/2010 |
| JP | 2011-147612 A | 8/2011 |
| JP | 2012-213489 A | 11/2012 |
| JP | 2015-506772 A | 3/2015 |
| JP | 2015-208574 A | 11/2015 |
| JP | 2018-102789 A | 7/2018 |
| JP | 2018-171168 A | 11/2018 |
| JP | 2019-033919 A | 3/2019 |

OTHER PUBLICATIONS

Oct. 6, 2020 International Search Report issued in International Patent Application No. PCT/JP2020/032705.

* cited by examiner

OCT DEVICE

TECHNICAL FIELD

The present disclosure relates to an OCT device that acquires (captures) OCT data of an examinee's eye.

BACKGROUND ART

An OCT device for obtaining OCT data of an examinee's eye is known. the OCT device performs various adjustments such as optical path length adjustment for adjusting the optical path lengths of measurement light and reference light, focus adjustment for adjusting the focus on a subject, and polarization adjustment for adjusting the polarization states of measurement light and reference light (see, for example, Patent Literature 1).

CITATION LIST

Patent Literature

Patent Literature 1: JP 2012-213489 A

SUMMARY OF INVENTION

In the photographing range of OCT data, when adjustments are performed on the same standard between the case where the curvature of a fundus image is small and the case where the curvature of a fundus image is large, it is difficult to obtain OCT data with good image quality in at least one of the cases.

On the other hand, it is considered that it is complicated for the examiner to manually perform adjustment work in accordance with each examinee's eye, the examination time is prolonged due to the complication, and burden is also imposed on the subject.

In view of the problems of the prior art, an object of the present disclosure is to provide an OCT device that can acquire good OCT data regardless of the curvature level of a fundus image.

An OCT device according to the first aspect of the present disclosure includes an OCT optical system that includes a beam splitter for splitting a beam from an OCT light source into a measurement optical path and a reference optical path and detects a spectral interference signal between measurement light guided to a fundus of an examinee's eye via the measurement optical path and reference light from the reference optical path, image processing means for acquiring OCT data of the fundus by processing the spectral interference signal output from the OCT optical system, and control means for adjusting a position of a high accuracy region which is a depth region allowing acquisition of relatively high accuracy OCT data by controlling the OCT optical system in accordance with a curvature level of a fundus image in a photographing range of the OCT data.

According to the present disclosure, good OCT data can be acquired regardless of the curvature level of a fundus image.

DESCRIPTION OF EMBODIMENTS

An example of an embodiment of the present disclosure will be described with reference to the accompanying drawings. FIGS. 1 to 7 are diagrams according to an example of the present embodiment. Note that items classified by < > below can be used independently or in association with each other.

Figure 1:
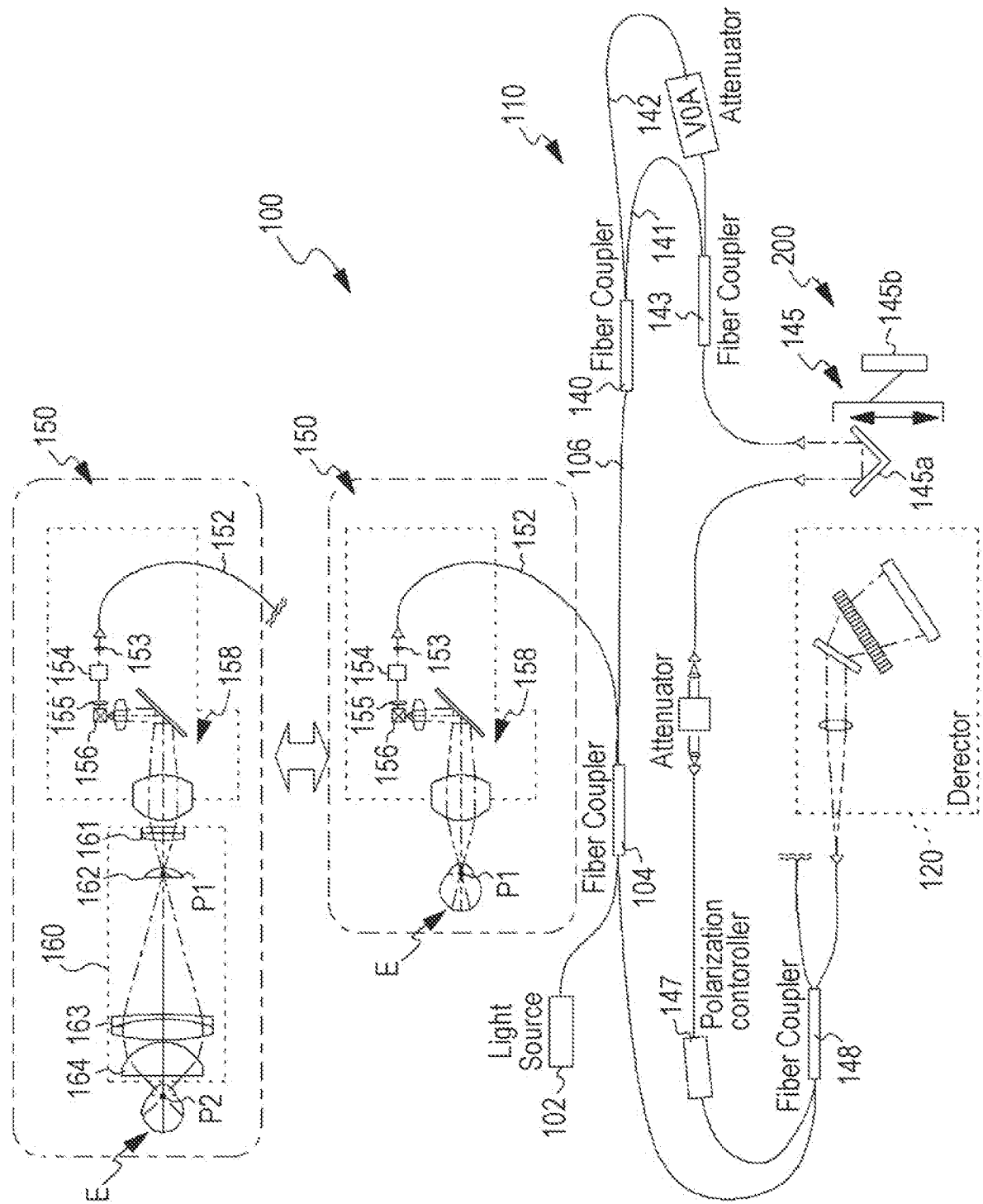
FIG. 1 is a diagram showing the optical system and control system of an OCT device according to the present example.
Figure 2:
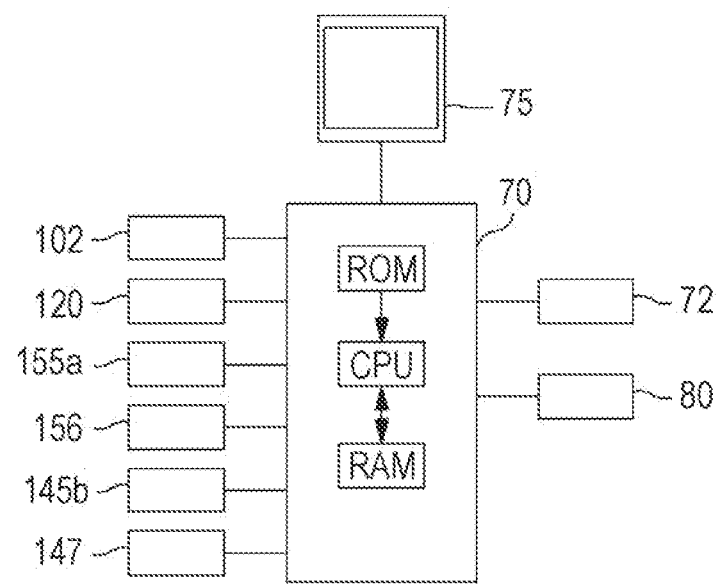
FIG. 2 is a diagram showing the control system of the OCT device according to the present example.

The OCT device according to the present embodiment includes an OCT optical system (see FIG. 1), an image processor (image processing means in the present embodiment), and a controller (control means in the present embodiment; see FIG. 2).

<OCT Optical System>

The OCT optical system may be, for example, a Fourier domain OCT optical system (SS-OCT optical system or SD-OCT optical system). The OCT optical system may include a beam splitter for splitting a beam from an OCT light source into a measurement optical path and a reference optical path. A detector may detect a spectral interference signal between measurement light guided to a subject via the measurement optical path and reference light from the reference optical path.

An optical scanner may be provided to scan an examinee's eye transversely (in a direction intersecting the depth direction) with the measurement light guided to the examinee's eye. The OCT optical system is not limited to the configuration including the optical scanner, and a full-field OCT optical system may be used.

The OCT optical system may include at least one of an optical path length adjuster (optical path length adjustment means in the present embodiment), a focus adjuster (focus adjustment means in the present embodiment), and a polarization adjuster (polarization adjustment means in the present embodiment).

<Optical Path Length Adjuster>

The optical path length adjuster changes at least one of the optical path lengths of the measurement optical path and the reference optical path. The optical path length adjuster may change the optical path length by moving the optical member disposed in at least one of the measurement optical path and the reference optical path by the driver, or may change the optical path length by adjusting the operating distance between the examinee's eye and the device.

<Focus Adjuster>

The focus adjuster is used to adjust the focus position (in-focus position) of measurement light. The focus adjuster may include, for example, a lens to be moved, a variable focus lens such as a liquid crystal lens, or an optical system that can change the optical path length. The optical system that can change the optical path length may be, for example, one or a plurality of lenses, mirrors, or a combination of them.

<Polarization Adjuster>

The polarization adjuster adjusts the polarization of at least measurement light or reference light. The polarization adjuster may be a polarizer and disposed in at least the measurement optical path or the reference optical path.

(Image Processor)

The image processor may be capable of obtaining OCT data by processing the spectral interference signal output from the OCT optical system.

Figure 3A:
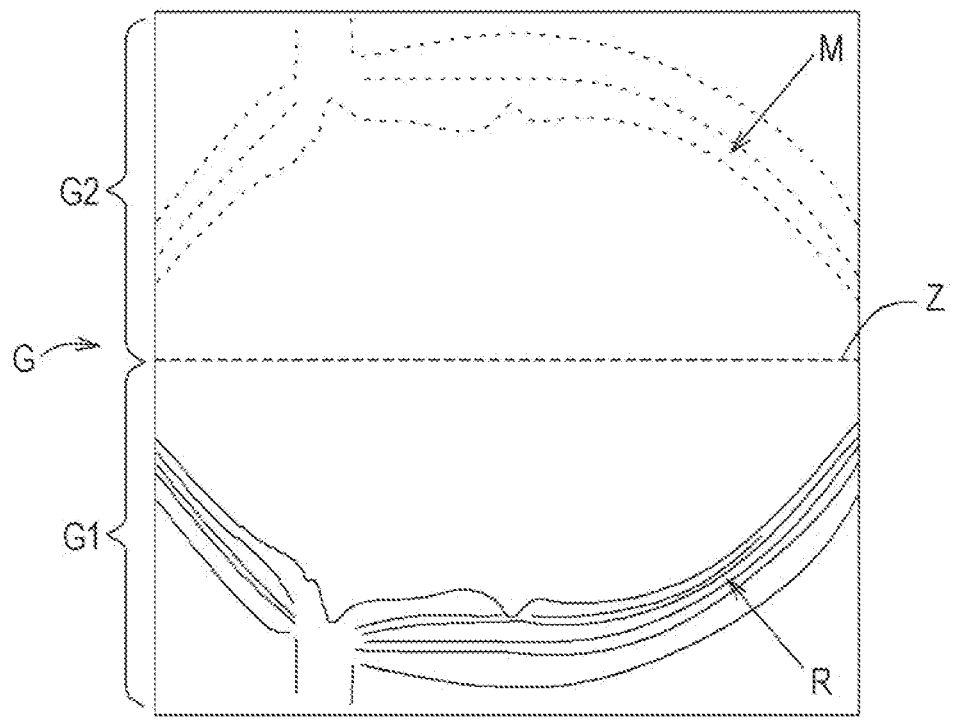
FIG. 3A is a diagram showing an example of OCT data according to the present example and a state in which a zero delay position is set on the shallow layer side compared with the retinal surface.
Figure 3B:
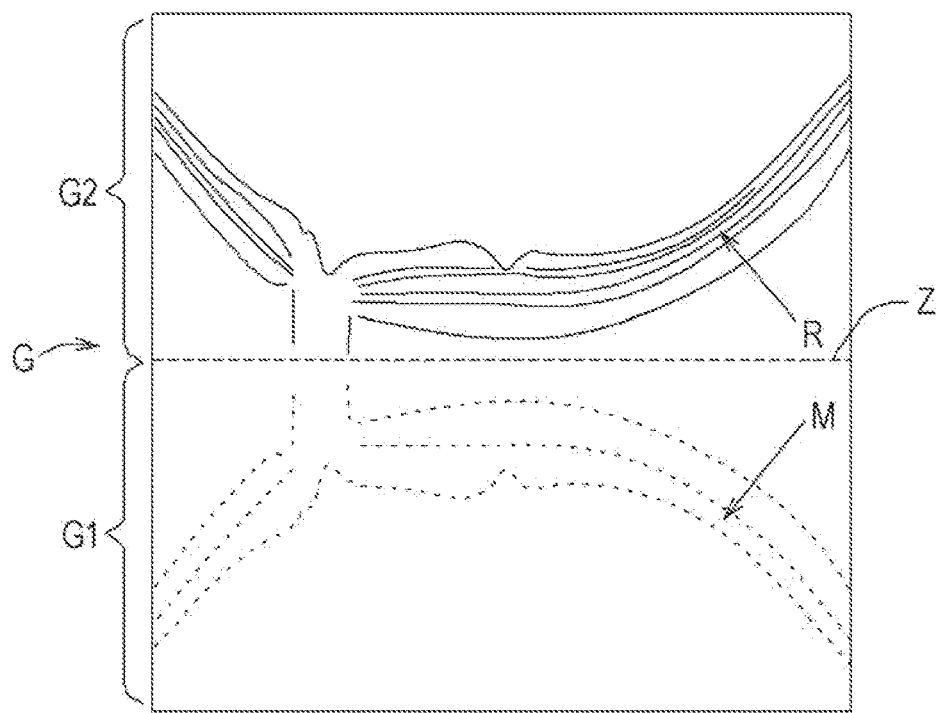
FIG. 3B is a diagram showing an example of OCT data according to the present example and a state in which a zero delay position is set on the deep layer side compared with the retinal surface.

In this case, a fundus image in the OCT data will be described with reference to FIGS. 3A and 3B. FIGS. 3A and 3B show image data G of a tomographic image which is an example of OCT data. The image data G includes first image data G1 corresponding to the far side from a zero delay position Z and second image data G2 corresponding to the near side from the zero delay position Z, which are images symmetrical to each other with respect to the zero delay position Z. More specifically, the real image and virtual fundus image are formed symmetrically with each other with respect to the zero delay position Z.

Referring to FIG. 3A, the optical path length is adjusted such that the zero delay position Z is formed on the front side (shallow layer side) of the retinal surface, and in this case, a normal image is acquired as a real image. The retinal surfaces face each other between the first image data G1 and the second image data G2. In this case, a real image is acquired in the first image data G1, and a virtual image (mirror image) is acquired in the second image data G2.

On the other hand, the optical path length is adjusted such that the zero delay position Z is formed on the far side of the retinal surface, and a reverse image is acquired as a real image, as shown in FIG. 3B. In this case, the retinal surfaces face in opposite directions between the first image data G1 and the second image data G2. In this case, a real image is acquired in the second image data G2, and a virtual image (mirror image) is acquired in the first image data G1.

One of the real image and the virtual image thus formed may be extracted as a tomographic image displayed on the monitor.

<Application of Full Range Technology>

Figure 4:
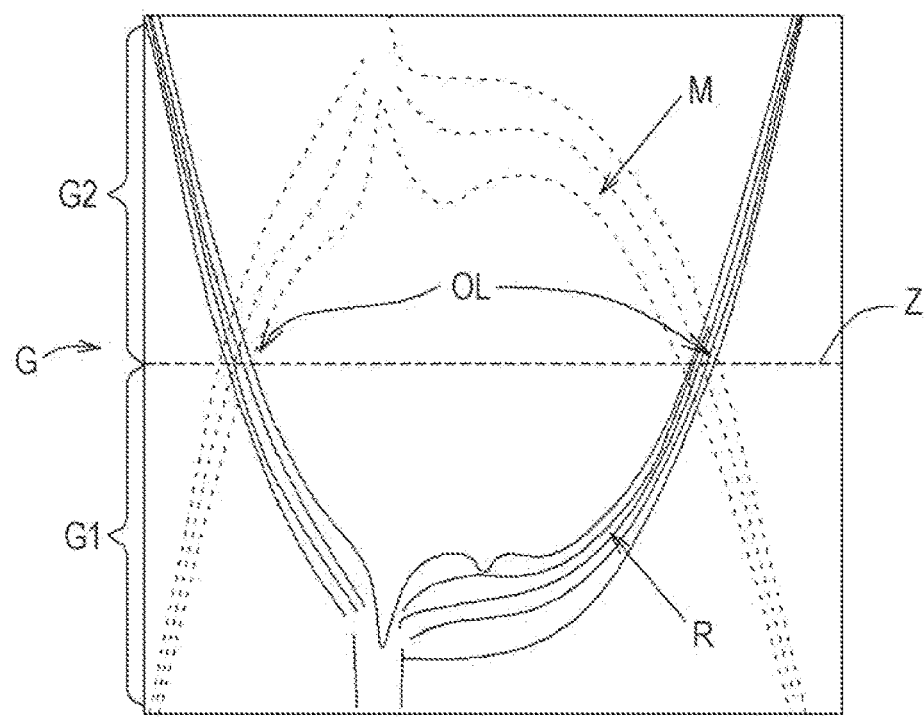
FIG. 4 is a diagram showing an example of OCT data in which a fundus image with a large curvature is depicted.

When the curvature of the fundus image is large, each of the real image and the virtual image is easily formed so as to straddle the zero delay position Z (see FIG. 4). In this case, an overlapping region OL between the real image and the virtual image is formed near the zero delay position Z.

On the other hand, various virtual image removal methods called the full range technology have been proposed. In the present embodiment, any full range technology may be applied, whereby a wide range of OCT data in which a virtual image is selectively removed may be able to be acquired. When the wide-range OCT data from which the virtual image is removed by the full range technology is used, it is possible to not only adjust the zero delay position Z to a position not overlapping with the fundus image as shown in FIGS. 3A and 3B but also set the zero delay position Z to a position overlapping with the fundus image, thereby obtaining good OCT data.

Note that examples of the full range technology include a technology of removing a virtual image (also referred to as a mirror image) by additional hardware (see, for example, Non-Patent Literature 1) and a technology of performing correction by software without using additional hardware (see, for example, Patent Literature 2).

Non-Patent Literature 1: Wojtkowski, M. et al. (2002) "Full range complex spectral optical coherence tomography technique in eye imaging", Optics Letters, 27 (16), p. 1415.

Patent Literature 1: JP 2015-506772 A

In addition, the patent application by the present applicant (Japanese Patent Application No. 2019-014771) proposes still another full range technology of generating OCT data subjected to a complementary process by performing at least the complementary process for the overlapping region between a real image and a virtual image in OCT data on the basis of a plurality of pieces of OCT data having different optical path lengths at the time of detecting a spectral interference signal. This technology may be applied to the present embodiment.

<Controller>

The controller (control means in the present embodiment; see FIG. 2) is a processor that controls various operations of the OCT device. The controller may include, for example, a CPU, a RAM, and a ROM. In addition, the controller may also serve as an image processor.

The controller can change the position of the depth region (hereinafter, referred to as a high accuracy region) where relatively highly accurate OCT data is obtained by controlling the OCT optical system.

The accuracy of OCT data is not necessarily uniform in the depth direction. The accuracy referred to herein may be represented by, for example, the level of interference sensitivity. For example, the sensitivity is higher in a depth region closer to the zero delay position Z on OCT data and decreases with distance from the zero delay position Z. That is, it can be said that OCT data has relatively high accuracy in the depth region close to the zero delay position Z. For example, in the tomographic image shown in FIG. 3A, the accuracy of the portion on the retinal surface side is higher than that of the portion on the choroid side, whereas in the tomographic image shown in FIG. 3B, the relationship is reversed. However, as in the tomographic images shown in FIGS. 3A and 3B, if the curvature of the fundus image is sufficiently small in the photographing range, it is considered that the difference in accuracy between the respective depth regions is easily allowable at the time of observation.

However, it is considered that the larger the curvature of the fundus image in the photographing range of OCT data (that is, as the height difference in the image of the subject is larger), the more difficult it is to allow the difference in accuracy in the respective depth regions.

On the other hand, the controller adjusts the position of the high accuracy region in accordance with the curvature level (the magnitude of the curvature) of the fundus image in the photographing range. For example, in the following description, the position of the high accuracy region is adjusted by driving and controlling at least the optical path length adjuster of the OCT optical system. As a result of adjusting the position of the high precision region according to the curvature level, OCT data that can be more properly and easily observed can be acquired, as described below. In this case, in each drawing, the high accuracy region is regarded as the zero delay position Z and its neighboring region.

For example, the position of a high accuracy region with respect to the reference position (for example, a predetermined layer of the retina at the central portion of the image) of the fundus image in each OCT data may be set to a different position for each OCT data in accordance with the curvature level of the fundus image. For example, in a case where curvature levels are roughly classified into a first level and a second level (larger in curvature than the first level), the positions of high accuracy regions with respect to the reference position of the fundus image may be set to different positions between a case where the curvature level is the first level and a case where the curvature level is the second level.

In this case, the controller may adjust the position of the high accuracy region to the shallower layer side in the case of the second level as compared with the case of the first level. Curvature levels may be classified into three or more levels, and the position of the high accuracy region may be adjusted to a position corresponding to each level.

At this time, in a case where the OCT data has been subjected to full range processing, for example, the position of the high accuracy region corresponding to at least the first level may be set to be on the shallower layer side than the retinal surface of the central region (the region near the central fovea) and on the deeper layer side than the choroid of the peripheral region.

Furthermore, in a case where a plurality of scan lines are included in a photographing range, the controller may adjust the position of the high accuracy region in accordance with the curvature level of the fundus image for each scan line (for each scan of each scan line). This makes it possible to obtain good OCT data on each scan line.

Further, the present disclosure is not necessarily limited to this, and the position of the high accuracy region may be controlled to be constant among a plurality of scan lines.

For example, the curvature of a fundus image becomes larger at a region closer to the periphery of the fundus, and the peripheral portion is depicted on a shallower layer side. In addition, under the present circumstances, there is not necessarily a high clinical need to observe deep layer information such as the choroid in the fundus peripheral portion as compared with the fundus central portion. Accordingly, when the fundus peripheral portion is included in the photographing range, the position of the high accuracy region is automatically adjusted to the shallower layer side, so that a smooth transition is made to a state suitable for the retinal surface side relatively emphasized in observation and diagnosis of the fundus peripheral portion.

In addition, for example, the curvature of the fundus image naturally depends on individual differences. The cases where individual differences in curvature pose problems include a case of a diseased eye accompanied by elongation of the ocular axial length, such as a case of axial myopia. In a case where problematic curvature occurs, it is considered that thinning occurs in the fundus central portion. Since the thinning occurs, the fundus itself is in a state in which it is easy to acquire information of the deep layer such as the choroid in the fundus central portion with high accuracy, and thus the position of the high accuracy region is adjusted to the shallower layer side, so that the fundus tissue at each position is easily and properly photographed.

The curvature of the fundus image increases on the more peripheral side. That is, the curvature of the fundus image depends on the size and position of the photographing range of the OCT data on the fundus. Accordingly, when the examiner is requested to perform an operation of setting the photographing range of the OCT data, the curvature level of the fundus image corresponds to the photographing range set as a result of the operation. Therefore, the position of the high accuracy region may be adjusted by controlling the OCT optical system (in this case, the optical path length adjuster) in accordance with the photographing area set as a result of the operation. The operation of setting a photographing range may be, for example, an operation of speci- fying the acquisition range of volume data, a selection operation of selecting one of a plurality of predetermined scan patterns, an operation of setting the scan line to an arbitrary position and length on the fundus, or other opera- tions.

In this case, assuming that the curvature level in a case where the fundus central portion is in the photographing range may be the first level, the curvature level in a case where the fundus peripheral portion is included in the photographing range may be the second level.

In this case, the OCT device may include an operation detector that detects (accepts) the operation of setting a photographing range. The operation detector may be imple- mented by, for example, a controller and an input interface.

In addition, the photographing range of OCT data is regulated by the view angle of the OCT optical system. The OCT device may include a view angle switcher that optically changes the view angle of the OCT optical system. The view angle switcher may be capable of switching the view angle between a first view angle corresponding to the fundus central portion and a second view angle corresponding to a wide angle region including the central portion and fundus peripheral portion. In this case, as compared with the case of the first view angle, a larger curvature may occur in the fundus image in the case of the second view angle. Accord- ingly, the controller may adjust the position of the high accuracy region by controlling the OCT optical system in accordance with the curvature level within the photograph- ing range in consideration of the view angle. In this case, for example, the curvature level corresponding to the first view angle may be the first level, and the curvature level corre- sponding to the second view angle may be the second level.

The view angle switcher may be, for example, a mecha- nism that inserts and removes an optical element such as a lens into and from a measurement optical path from the beam splitter to the examinee's eye. The view angle switcher may be, for example, a mechanism for displacing the position of the objective optical system in the OCT optical system.

In addition, obviously, the curvature of a fundus image depends on the curvature of the fundus itself. The cases where the curvature of the fundus poses problems include a case of a diseased eye accompanied by elongation of the ocular axial length, such as a case of axial myopia. Accord- ingly, in the present embodiment, the controller may adjust the position of the high accuracy region by controlling the OCT optical system in accordance with the curvature level in consideration of the ocular axial length information of the examinee's eye. In this case, assuming that the curvature level when the ocular axial length is in the first range (for example, the normal range) may be the first level, the curvature level when the ocular axial length is in the second range (for example, long ocular axial length) may be the second level.

Ocular axial length information is information related to an ocular axial length value. An ocular axial length value may be measured via the OCT optical system, and the measured value may be acquired as ocular axial length information. For example, ocular axial length information can be calculated based on a working distance and the depth position information of the retinal surface acquired via the OCT optical system. The depth position information (pref- erably, central fovea depth position information) of the retinal surface may be acquired based on one or both of the optical path length difference between measurement light and reference light and a spectral interference signal. In this case, the working distance may be a value when the alignment is completed, and the optical path length difference may be a value when the zero delay position Z is disposed on the retinal surface. In addition, the ocular axial length information may be acquired as a measurement result by an ocular axial length measuring device separate from the OCT device.

Furthermore, the controller may more directly adjust the position of the high accuracy region on the basis of the information indicating the curvature level of the fundus image. In this case, for example, information indicating the curvature level may be acquired as a processing result for OCT data.

Information about a curvature level may be acquired based on the OCT data acquired when the optical path length is adjusted in optimization control (optimize) of the photographing conditions. For example, information regarding a curvature level may be acquired as a processing result of image processing for the OCT data.

In optimization control (to be referred to as optimize), the zero delay position Z in the OCT data is adjusted so as to be disposed at a predetermined position (for example, always nearer than the retinal surface) with respect to the fundus image. For example, the zero delay position Z may be further adjusted so as to maximize the evaluation value regarding the signal intensity of the fundus image.

In the OCT data obtained after the adjustment, the magnitude of the curvature of the fundus image can be grasped by the ratio between a portion of the fundus image which is included in a range A within a predetermined distance on the far side from the zero delay position Z and a portion of the fundus image which is included in a range B more distant from the predetermined distance. That is, it is considered that the larger the curvature, the larger the proportion of the portion of the fundus image included in the range A because the fundus image is formed up to the deeper layer side.

In addition, curve fitting may be performed on the fundus image in the OCT data to acquire a curvature level based on the curvature of the fitting curve. At the time of curve fitting, segmentation processing may be appropriately performed on the fundus image.

Polarized light between measurement light and reference light also has a correlation with interference sensitivity in each depth region. For example, the polarization state of reflected/scattered light is different for each tissue of the examinee's eye (for each layer of the fundus). Accordingly, when the polarization between measurement light and reference light is adjusted so as to optimize the sensitivity (interference sensitivity) for a certain tissue, the adjustment does not necessarily obtain good sensitivity for a tissue in another depth region.

Furthermore, for example, the accuracy may originate from focusing. That is, a depth region closer to the focus position of measurement light generates higher contrast data, but the contrast decreases with distance from the focus position. Therefore, when attention is paid on resolution as a target indicating accuracy, it can be said that OCT data has relatively high accuracy in a depth region close to the focus position.

Accordingly, in the present embodiment, for example, at least the focus position or the polarization may be adjusted in conjunction with the adjustment of the optical path length. In this case, the focus position may be adjusted so as to optimize the contrast in the region near the zero delay position Z. Furthermore, the polarization may be adjusted so as to optimize the interference sensitivity in the tissue near the zero delay position Z. Note that, for example, for a method of adjusting polarization so as to optimize interference sensitivity in a specific tissue, refer to JP 2018-102789 A by the present applicant.

Note that, in the present embodiment, the high accuracy region in the present embodiment is changed in accordance with at least the optical path length. However, the present invention is not necessarily limited to this, and the high accuracy region may be changed in accordance with at least one of the focus position and the polarization.

Furthermore, the dispersion amount of the optical system between the measurement optical path and the reference light may be changed in conjunction with the control of the high accuracy region. This makes it possible to acquire better OCT data.

Furthermore, in the present embodiment, the image processor may correct the layer thickness of OCT data in accordance with the displacement of the optical path length of the measurement light to the retinal surface between the respective scan positions and display the corrected data. That is, a region having a large influence of curvature such as a peripheral region of the fundus is depicted as if the layer thickness is thin (see FIG. 4). Accordingly, the image in which the influence of curvature is corrected may be displayed by performing image conversion such as deforming the image in consideration of the influence of curvature or adjusting the aspect ratio.

Example

Hereinafter, an optical coherence tomography (OCT) apparatus shown in FIGS. 1 and 2 will be described as an example. The OCT device according to the present example has, for example, a spectral domain OCT (SD-OCT) as a basic configuration.

An OCT device 1 includes a light source 102, an OCT optical system 100, and a calculation controller (calculation control part) 70 (see FIG. 2). In addition, the OCT device may be provided with a memory 72, a display unit 75, a front image observation system (not shown), and a fixation target projection system. The calculation controller (hereinafter, the controller) 70 is connected to the light source 102, the OCT optical system 100, the memory 72, and the display unit 75.

The OCT optical system 100 guides measurement light to the eye E through a light guiding optical system 150. The OCT optical system 100 guides the reference light to the reference optical system 110. The OCT optical system 100 causes a detector (light receiving element) 120 to receive interference signal light acquired by the interference between the measurement light reflected by the eye E and the reference light. Note that the OCT optical system 100 may be mounted in a housing (device main body) (not shown) and may perform alignment with respect to the examinee's eye by three-dimensionally moving the housing with respect to the eye E by a known alignment moving mechanism via an operation member such as a joystick.

An SD-OCT scheme is used for the OCT optical system 100. A light source that emits a light flux having a low coherence length is used as the light source 102, and a spectroscopic detector that spectrally disperses and detects a spectral interference signal for each wavelength component is used as the detector 120.

A coupler (splitter) 104 is used as a first beam splitter and splits the beam emitted from the light source 102 into a measurement optical path and a reference optical path. For example, the coupler 104 guides light from the light source 102 to an optical fiber 152 on the measurement optical path side and guides the light to the reference optical system 110 on the reference optical path side.

<Light Guiding Optical System>

The light guiding optical system 150 is provided to guide measurement light to the eye E. The light guiding optical system 150 may be sequentially provided with, for example, the optical fiber 152, an collimator lens 153, a variable beam expander 154, a focusing lens 155, an optical scanner 156, and an objective lens system 158 (objective optical system in the present example). In this case, measurement light is emitted from the emission end of the optical fiber 152 and is collimated into a parallel beam by the collimator lens 153. The beam is then adjusted to a desired light flux diameter is by the variable beam expander 154 and is directed to the optical scanner 156 via the focusing lens 155. The focusing lens 155 can be displaced along the optical axis by a driver (not shown) and is used to adjust a light condensing state at the fundus. The light having passed through the optical scanner 156 is applied to the eye E via the objective lens system 158. A first pivot point P1 is formed at a position conjugate with the optical scanner 156 with respect to the objective lens system 158. When the anterior segment is located at the pivot point P1, the measurement light reaches the fundus without vignetting. In addition, the measurement light is scanned on the fundus in accordance with the operation of the optical scanner 156. At this time, the measurement light is scattered and reflected by the tissue of the fundus.

The optical scanner 156 may scan the eye E with the measurement light in the XY direction (transverse direction). The optical scanner 156 includes, for example, two galvano mirrors, and its reflection angle is arbitrarily adjusted by a drive mechanism. The light flux emitted from the light source 102 is changed in reflection (traveling) direction and scanned in an arbitrary direction on the fundus. As the optical scanner 156, for example, in addition to a reflection mirror (Galvano mirror, polygon mirror, or resonant scanner), an acousto-optic element (AOM) or the like that changes a traveling (deflection) direction of light may be used.

Scattered light (reflected light) from the eye E originating from the measurement light goes back along the path at the time of light projection, enters the optical fiber 152, and reaches the coupler 104. The coupler 104 guides light from the optical fiber 152 to an optical path toward the detector 120.

<Attachment Optical System>

In the OCT device according to the example, an attachment optical system 160 (an example of the "view angle switcher") is inserted and removed between the objective optical system 158 in the light guiding optical system 150 and an examinee's eye E. By attaching and detaching the lens barrel including the attachment optical system to and from a housing surface (not shown), the attachment optical system 160 is inserted and removed between the objective optical system 158 and the examinee's eye.

The attachment optical system 160 may include a plurality of lenses 161 to 164. In this case, the main lens having positive power in the attachment optical system 160 shown in FIG. 1 is the lens 164 placed in front of the examinee's eye. At least the insertion/removal position of the lens 164 is between the first pivot point P1 formed by the objective optical system 158 and the examinee's eye E. At least the lens 164 bends the measurement light having passed through the first pivot point P1 toward an optical axis L so as to form a second pivot point P2 at a position conjugate with the optical scanner 156 with respect to the attachment optical system 160 and the objective optical system 158. That is, the attachment optical system 160 is an optical system that relays the pivot point P1 to the pivot point P2.

In the present example, the solid angle of the measurement light at the second pivot point P2 is larger than the solid angle at the first pivot point P1. For example, the solid angle at the second pivot point P2 is increased to twice or more the solid angle at the first pivot point P1. In the present embodiment, scanning can be performed at a view angle of about φ60° in the retracted state, and scanning can be performed at a view angle of about φ100° in the inserted state.

The variable beam expander 154 is a light flux diameter adjuster in the embodiment. For example, the variable beam expander 154 may have a plurality of lenses forming a both side telecentric optical system and may be configured to switch a light flux diameter by changing a lens interval using an actuator. The variable beam expander 154 adjusts the light flux diameter of the measurement light based on an instruction from the controller 70.

Assume that the light flux diameter of the measurement light guided from the variable beam expander 154 to the optical scanner 156 is constant between the inserted state and the retracted state. In this case, since the spot size of the measurement light on the fundus is proportional to the view angle, the resolving power decreases in the inserted state as compared with the retracted state. Accordingly, in the present embodiment, the controller 70 drives the variable beam expander 154 in accordance with the insertion and removal of the attachment optical system to reduce the light flux diameter in the inserted state with respect to the retracted state. Since the ratio between the light flux diameter (the light flux diameter in the variable beam expander 154) in the inserted state and the light flux diameter in the retracted state is the reverse ratio between the view angle in the inserted state and the view angle in the retracted state, it is possible to suppress a change in resolving power due to insertion and removal of the attachment optical system 160.

In order to secure a sufficient operation distance, it is necessary for the attachment optical system 160 to bend the measurement light from a position with a sufficient light beam height toward the optical axis L. In addition, in order to suppress the aberration generated in the attachment optical system 160 within an allowable range, there is a limitation on the power of each lens included in the attachment optical system 160. Therefore, it is difficult to shorten the optical path length of the attachment optical system 160.

Some conventional OCT devices are configured to adjust the optical path length difference between reference light and measurement light. However, there is no conventional OCT device configured to have an adjustment range applicable to insertion and removal of the attachment optical system 160. For example, there is a conventional configuration having an optical adapter attached to a fundus photography OCT to enable anterior segment photography (see, for example, "JP 2011-147612" by the present applicant). However, this optical adapter does not relay the pivot point formed by the optical system of the device body, and there is no need to widen the scanning range, so that the optical adapter can be formed with a relatively short optical path length. Further, as the optical adapter is inserted, the position of the image plane is shifted from the fundus to the anterior segment. Accordingly, it is not necessary to greatly adjust the optical path difference with the insertion of the optical adapter.

<Reference Optical System>

The reference optical system 110 generates reference light combined with fundus reflected light of the measurement light. The reference light having passed through the reference optical system 110 is multiplexed and interfered with light from the measurement optical path by a coupler 148. The reference optical system 110 may be a Michelson type or a Mach-Zehnder type.

The reference optical system 110 shown in FIG. 1 is formed by a transmission optical system. In this case, the reference optical system 110 guides light from the coupler 104 to the detector 120 by transmitting the light without returning the light. Alternatively, the reference optical system 110 may be formed by, for example, a reflection optical system and may guide light from the coupler 104 to the detector 120 by reflection by the reflection optical system.

In the present embodiment, the reference optical system 110 may be provided with a plurality of reference optical paths. For example, referring to FIG. 1, the coupler 140 splits the reference optical path into an optical path passing through a fiber 141 (the first branch optical path in the present example) and an optical path passing through a fiber 142 (the second branch optical path in the present example). The fiber 141 and the fiber 142 are connected to a coupler 143 to couple the two branch optical paths and cause them to enter a coupler 148 through an optical path length difference adjuster 145 and a polarization adjuster 147.

In the present example, reference light from the coupler 104 is simultaneously guided to the fiber 141 and the fiber 142 by the coupler 143. The light passing through either the fiber 141 or the fiber 142 is multiplexed with measurement light (fundus reflected light) by the coupler 148.

The optical path length difference between the fiber 141 and the fiber 142, that is, the optical path length difference between the first branch optical path and the second branch optical path, may be a fixed value. In the present example, the optical path length difference is substantially the same as the optical path length of the attachment optical system 160.

Note that an optical member for adjusting the optical path length difference between measurement light and reference light may be disposed on at least the measurement optical path or the reference optical path. For example, the optical system shown in FIG. 1 is provided with a reference optical path adjuster 145 and a mirror 145a having two orthogonal surfaces at the location to adjust the optical path length difference between measurement light and reference light. The mirror 145a is moved in the arrow direction by an actuator 145b to increase or decrease the optical path length of the reference optical path. Obviously, the configuration for adjusting the optical path length difference between measurement light and reference light is not limited to this. For example, in the light guiding optical system 150, the collimator lens 153 and the coupler may be integrally moved to adjust the optical path length of measurement light, thereby adjusting the optical path length difference between the measurement light and the reference light.

In this case, in the present example, since the reference optical path adjuster 145 is provided on the optical path between the coupler 143 and the coupler 148, that is, on the common optical path between the first branch optical path and the second branch optical path, it is possible to collectively perform adjustment of the optical path length difference between the measurement optical path and the reference optical path, that is, adjustment regarding the individual difference in ocular axial length, on both the first branch optical path and the second branch optical path.

Note that the adjustment range of the optical path length in the reference optical path adjuster 145 is preferably set sufficiently short with respect to the optical path length difference between the fiber 141 and the fiber 142 (in other words, the optical path length difference between the first branch optical path and the second branch optical path).

<Light Detector>

The detector 120 is provided to detect the interference between light from the measurement optical path and light from the reference optical path. In the present example, the detector 120 is a spectroscopic detector and includes, for example, a spectroscope and a line sensor, and the measurement light and the reference light multiplexed by the coupler 148 are dispersed by the spectroscope and received in different regions (pixels) of the line sensor for each wavelength. As a result, an output for each pixel is acquired as a spectral interference signal.

The curvature of the fundus does not necessarily coincide with the imaging plane (condensing plane) of measurement light. In the inserted state of the attachment optical system 150, the divergence between them increases in at least the fundus central portion or the fundus peripheral portion. Therefore, in the light detector, it is preferable to secure a sufficient effective depth range in consideration of the divergence. For example, for SD-OCT, it is preferable to use a line camera having a sufficient number of pixels for a desired effective depth. Furthermore, a configuration described later as <Modification> may be further adopted.

<Acquisition of Depth Information>

The controller 70 processes (Fourier analyzes) the spectrum signal detected by the detector 120 to obtain the OCT data of the examinee's eye.

The spectral signal (spectral data) may be rewritten as a function of a wavelength $\lambda$ and converted into a function $I(k)$ that is equally spaced with respect to a wavenumber k ($=2\pi/\lambda$). Alternatively, this data may be acquired as the function $I(k)$ equally spaced with respect to the wave number k from the beginning (K-CLOCK technology). The calculation controller may obtain OCT data in the depth (Z) domain by Fourier transforming the spectral signal in the wavenumber k space.

Furthermore, the information after Fourier transform may be represented as a signal including a real component and an imaginary component in the Z space. The controller 70 may obtain the OCT data by obtaining the absolute values of the real component and the imaginary component in the signal in the Z space.

In this case, the reference light passing through the first branch optical path and the reference light passing through the second branch optical path are simultaneously guided to the coupler 148 and each are multiplexed with the measurement light. Since there is a large optical path length difference as large as the optical path length of the attachment optical system 160 between the first branch optical path and the second branch optical path, one of the reference light passing through the first branch optical path and the reference light passing through the second branch optical path is likely to interfere with the measurement light, but the other is unlikely to interfere. Although the spectral interference signal from the detector 120 includes a component of the reference light passing through the first branch optical path and a component of the reference light passing through the second branch optical path, one of the two types of components which corresponds to the state of the light guiding optical system 150 is obtained as a remarkably stronger signal than the other. As a result, good OCT data can be obtained regardless of the state of the light guiding optical system 150. That is, by including the plurality of reference optical paths having the optical path length difference corresponding to the attachment optical system 160, the OCT device according to the example compensates the change amount of the optical path length difference between the measurement optical path and the reference optical path, which is the change amount accompanying the insertion and removal of the attachment optical system 160, regardless of the state of the light guiding optical system 150.

Note that it is necessary to control the reference optical path adjuster 145 to adjust in advance the optical path length difference between the measurement optical path and the reference optical path, that is, the optical path length difference regarding the ocular axial length of the examinee's eye. In the present example, for example, the mirror 145a may be moved within a predetermined adjustment range and an interference signal at each position may be acquired to determine the position of the mirror 145a with reference to the position where the intensity of the interference signal is the highest. When the adjustment range of the optical path length in the reference optical path adjuster 145 is sufficiently small with respect to the optical path length difference between the first branch optical path and the second branch optical path, the position of the intensity peak of the interference signal can be uniquely specified in the adjustment range of the reference optical path adjuster 145.

Note that, in the inserted state, since the fundus reflected light of the measurement light from the fundus peripheral portion is weak with respect to the reflected light from the fundus central portion, the optical path length difference between the measurement optical path and the reference optical path may be adjusted by the reference optical path adjuster 145 such that the zero delay position between the measurement optical path and the reference optical path overlaps the desired fundus tissue (for example, retina, choroid, or sclera) or light transmission tissue (corpus vitreum or the like) in the fundus peripheral portion.

<Distribution Correction by Software>

Note that, in the present example, the controller 70 may perform distributed correction processing by software on the spectrum data output from the detector 120. The controller 70 obtains OCT data based on the spectral data after the dispersion correction. Therefore, there is a difference in image quality between the real image and the virtual image.

That is, in the present example, the difference in the dispersion amount of the optical system between the measurement optical path and the reference optical path is corrected in the form of signal processing. More specifically, the correction is performed by applying a correction value stored in advance in the memory 72 to the processing of the spectrum signal.

The controller 70 acquires the spectral intensity of light on the basis of the light reception signal output from the detector 120 and rewrites the spectral intensity as a function of the wavelength $\lambda$. Next, the spectral intensity $I(\lambda)$ is converted into functions $I(k)$ at equal intervals with respect to the wave number k $(=2\pi/\lambda)$.

The influence of the dispersion mismatch between the measurement light and the reference light shifts the phase of the interference component, lowers the peak of the multiplexed signal of each wavelength, and causes the signal to spread (the resolution is lowered). Accordingly, in the dispersion correction, by returning the phase shifted for each wavelength, a decrease in resolution due to a decrease in the interference signal is corrected. In this case, a phase shift amount $\varphi(k)$ as a function of the wave number k is obtained, and the phase shift is returned for each value of k by $I(k)\cdot\exp{-i\varphi(k)}$. In this case, the phase $\varphi(k)$ to be subjected to dispersion correction can be obtained in advance by calibration, or the phase $\varphi(k)$ corresponding to the acquired tomographic image may be obtained. The memory 72 then stores a parameter for dispersion correction (for example, the phase $\varphi(k)$).

Thereafter, the controller 70 performs Fourier transform on the spectral intensity $I(k)$ after dispersion correction corrected by the set dispersion correction data, thereby obtaining OCT data.

For example, a first variance correction value (for a normal image) is acquired from the memory 72 as a dispersion correction value for correcting the influence of the dispersion on the real image, the spectrum data output from the detector 120 is corrected using the first dispersion correction value, and the corrected spectrum intensity data is Fourier-transformed to form OCT data. The real image R is acquired as a high-sensitive and high-resolution image, and the virtual image M (mirror image) is acquired as a low-resolution blurred image due to a difference in dispersion correction value.

As a result, when the real image is acquired in a first image region G1, the real image is acquired as a high-sensitive and high-resolution image, and the virtual image (mirror image) is acquired as a low-resolution blurred image due to the difference in the dispersion correction value in a second image region G2. On the other hand, when the real image is acquired in the second image region G2, the virtual image is acquired in the first image region G1 as a low-resolution blurred image due to a difference in dispersion correction value.

Obviously, the present invention is not limited to this, and software dispersion correction may be performed on the virtual image M. In this case, the virtual image M is acquired as a high-sensitive and high-resolution image, and the real image R is acquired as a low-resolution blurred image.

Note that, for details of the method of performing dispersion correction by software as described above, refer to U.S. Pat. No. 6,980,299, JP 2008-501118 A, and the like. Further, refer to JP 2010-29648 A.

In a case where the dispersion correction processing by software is performed, when obtaining OCT data in the fundus central portion, for example, the controller 70 may extract image data having higher sensitivity and resolution from the image data of the real image and the virtual image.

Note that, in the present example, the first correction value corresponding to the retracted state and the second correction value different from the first correction value and corresponding to the inserted state are stored in advance in the memory 72, and the correction value to be applied is switched according to the state of the light guiding optical system. As a result, in the OCT device according to the example, the amount of change in the dispersion amount between the measurement optical path and the reference optical path, that is, the amount of change accompanying insertion and removal of the attachment optical system 160, is compensated in each state of the light guiding optical system 150.

Furthermore, in the present example, a plurality of second correction values corresponding to the inserted state are set in accordance with the scanning position of measurement light. More specifically, a correction value for the fundus central portion and a correction value for the fundus peripheral portion are set as the second correction values with different values. For example, the first correction value may be applied to a region within $\varphi60°$ of the fundus, and the second correction value may be set as a value applied to a region more distant than $\varphi60°$. Since the attachment optical system 160 has large power as a whole, it is conceivable that a significant difference in dispersion amount occurs between a light flux passing through the fundus central portion and a light flux passing through the fundus peripheral portion. On the other hand, in the present example, since the correction value for the dispersion amount is changed in accordance with the irradiation position of measurement light in the fundus, it is possible to obtain good OCT data in the wide angle region of the fundus.

Obviously, the second correction value may be further subdivided. For example, the entire fundus may be divided into a fundus central portion, a first fundus peripheral portion outside the fundus central portion, and a second fundus peripheral portion outside the first fundus peripheral portion, and a correction value corresponding to the fundus central portion, a correction value corresponding to the first fundus peripheral portion, and a correction value corresponding to the second fundus peripheral portion may be set as different values as the second correction values.

<Control System>

The controller 70 may include a CPU (processor), a RAM, and a ROM) (see FIG. 2). For example, the CPU of the controller 70 may control the OCT device. The RAM temporarily stores various types of information. The ROM of the controller 70 may store various programs for controlling the operation of the OCT device, initial values, and the like.

A nonvolatile memory (to be abbreviated as a memory hereinafter) 72 as a storage unit, a display unit 75, and the like may be electrically connected to the controller 70. As the memory 72, a non-transitory storage medium may be used, which can hold stored contents even when power supply is cut off. For example, a hard disk drive, a flash ROM, a USB memory detachably attached to the OCT device, or the like can be used as the memory 72. The memory 72 may store a control program for controlling the acquisition of the OCT data and the photographing of the OCT image. Furthermore, in addition to the OCT image generated from the OCT data, various types of information regarding photographing may be stored in the memory 72. The display unit 75 may display the OCT image generated from the OCT data.

Note that an insertion/removal detector that automatically detects whether or not the attachment optical system 160 is inserted into the light guiding optical system may be provided, and the controller 70 may execute control and processing of each unit of the OCT optical system 100 on the basis of a detection signal from the detector. For example, the OCT device may appropriately execute the switching control of the light flux diameter using the variable beam expander 154, the setting control of the zero delay position using the reference optical path adjuster 145, the change processing of the dispersion amount of the optical system between the measurement optical path and the reference light, and the like. The insertion detector may be a sensor disposed near the objective optical system 158.

Obviously, the examiner may input information specifying the state of the light guiding optical system (the inserted state/retracted state of the attachment optical system 160) to the user interface (UI) of the OCT device, and the controller may execute control and processing of each unit in the OCT optical system 100 on the basis of the information.

<Description of Operation>

The operation of the device according to the present example will be described next with reference to the flowchart of FIG. 5. The flowchart of FIG. 5 shows the flow of processing from various settings to photographing.

<Setting of View Angle>

Figure 5:
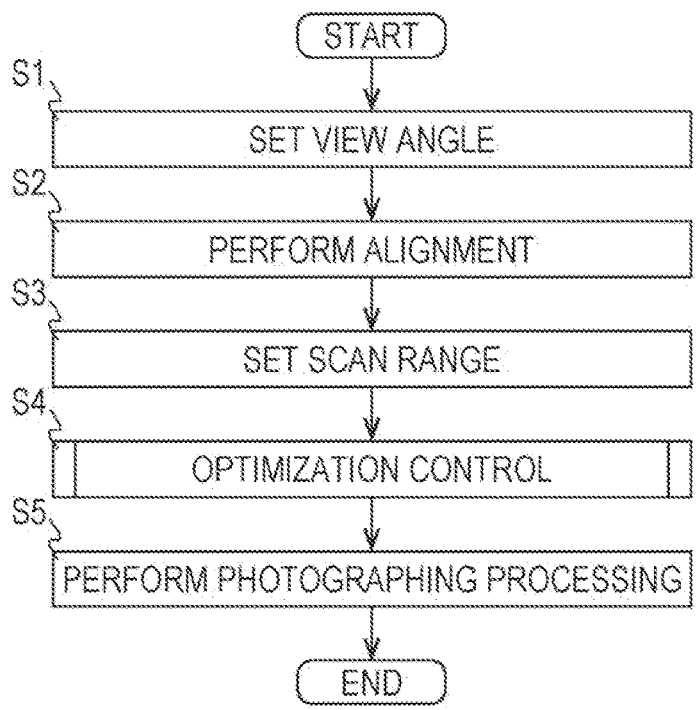
FIG. 5 is a flowchart showing an operation example of the OCT device according to the present example.

In the flowchart of FIG. 5, first of all, a view angle is set based on insertion/retraction of attachment optical system 160 (S1). The view angle setting operation is a part of the photographing range setting operation in the present example.

<Alignment>

The device is then aligned with respect to the examinee's eye (S2). After the subject gazes at the fixation target in advance, the positional relationship between the examinee's eye and the measurement optical axis is adjusted based on the anterior segment observation image photographed by the anterior segment observation camera (not shown). For example, the pupil center of the examinee's eye and the measurement optical axis are adjusted to coincide with each other. The alignment may be performed manually or automatically. At the position where the alignment adjustment is completed, a front fundus image may be acquired as an observation image via an observation optical system (not shown), and display on the monitor 75 may be started (see FIG. 6).

<Setting of Scan Range>

Figure 6:
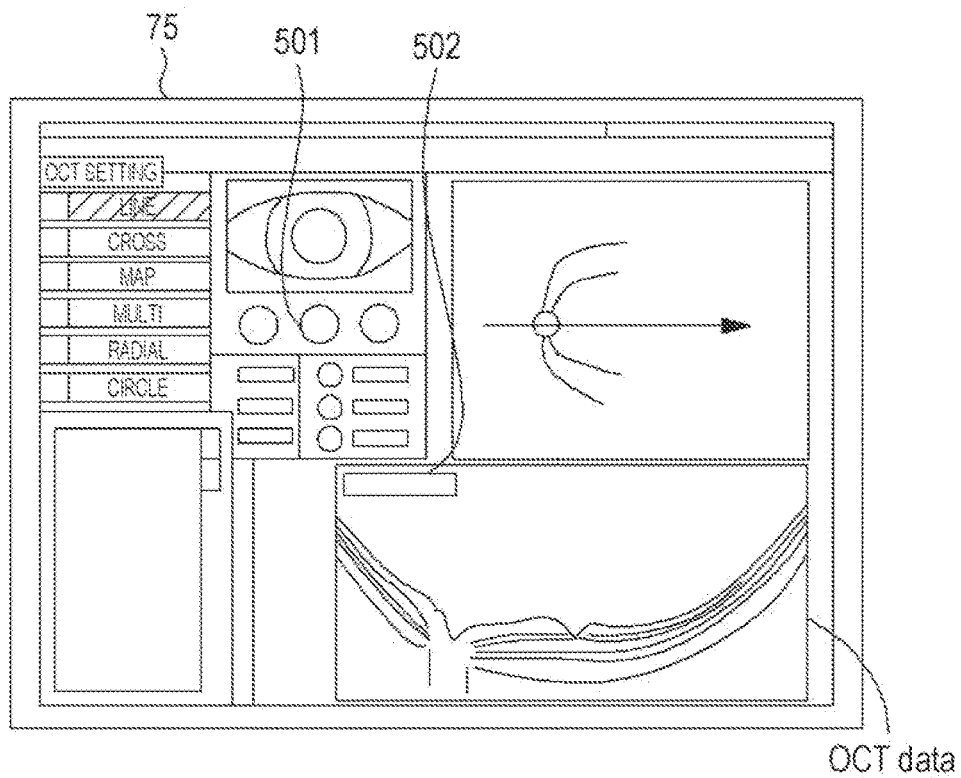
FIG. 6 is a diagram showing an example of a screen used for photographing.

Next, a scan range is set (S3). For example, as shown in FIG. 6, a scan line may be set on the basis of an operation input via an observation image displayed on the screen. The operation input at this time may set at least the start point and end point of a scan line on the observation image. Furthermore, the controller 70 may set a scan range by selecting one of a plurality of predetermined scan patterns. In this case, a scan pattern selection operation is input via an input interface 80. For example, the scan patterns include raster scan, multi scan in which a plurality of scan lines spaced apart from each other are scanned, cross scan in which a plurality of scan lines intersect each other, and radial scan in which a plurality of scan lines are radially formed.

<Optimization Control>

Next, optimization control is executed (S4). Optimization control may be started, for example, by operating an optimize button 501. Optimization control makes it possible to acquire highly accurate (for example, high sensitivity and high resolution) OCT data at a desired fundus region. Note that the optical path length, the focus, and the polarization state are adjusted by the optimization control (S4) according to the present example.

In the present example, optimization control starts in response to an optimization start operation with respect to the input interface 80 as a trigger. Hereinafter, the optimization control in the present example will be described as an example with reference to the flowchart of FIG. 7.

<Initialization>

First of all, the controller 70 initializes the optical path length and the focus position (S10). For example, the controller 70 moves each of the positions of the focusing lens 155 and the mirror 145*a* to a predetermined initial position (movement start position). In the present example, each initial position may be either the upper limit or lower limit of the movable range.

<Measurement of Ocular Axial Length>

After the initialization, the ocular axial length of the examinee's eye is measured (S12). The controller 70 adjusts the optical path length of the reference light so as to locate the zero delay position Z on the retinal surface. After the adjustment, the controller 70 acquires a spectral interference signal between the measurement light and the reference light emitted along the optical axis L.

Although not described in detail, the ocular axial length of the examinee's eye is calculated and acquired by the controller 70 on the basis of the working distance and the depth position information of the retinal surface acquired via the OCT optical system. At this time, the distance between the irradiation position of the measurement light, that is, the irradiation position on the cornea, and the irradiation position on the retina can be obtained as the ocular axial length.

The working distance is a distance between the device and the examinee's eye in the front-back direction. In the present example, the working distance is assumed to be a fixed value. However, the working distance may be an actual measurement value. In this case, the working distance may be obtained from the drive amount of the driver for adjusting the positional relationship between the OCT optical system 100 and the examinee's eye in the Z direction.

<Determination of Curvature Level of Fundus Image>

Next, the controller 70 executes a curvature level determination process. In the determination process, the curvature level of the fundus image in the photographing range set in the processing in S1 and S3 is determined. A depth region (high accuracy region) where relatively high accurate OCT data is obtained is adjusted in accordance with the determination result of the curvature level.

Figure 7:
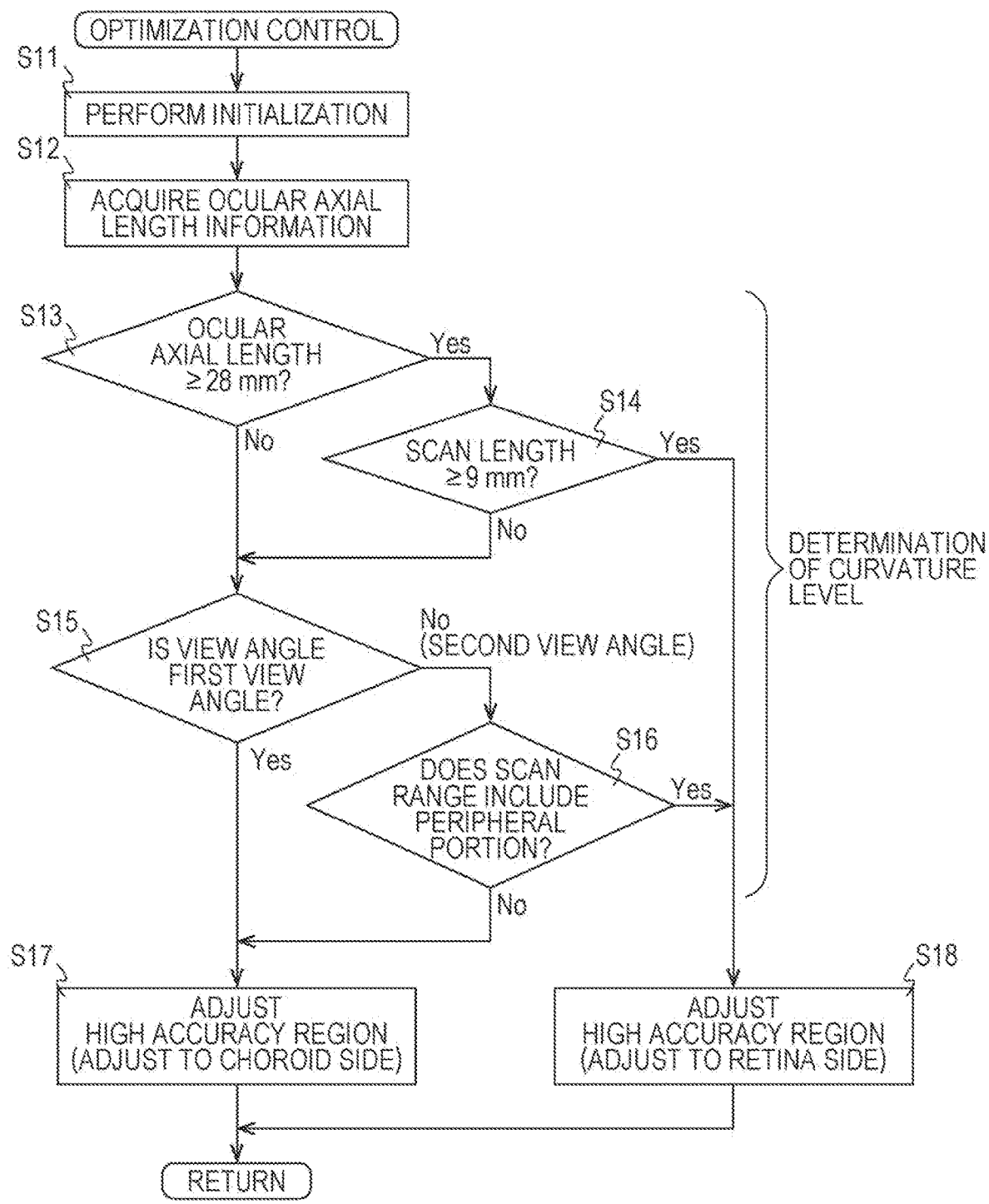
FIG. 7 is a flowchart showing an example of optimization control.

In the flowchart of FIG. 7, S13, S14, S15, and S16 are illustrated as an example of the determination processing in the present example.

The flowchart of FIG. 7 includes two types of determination processing.

In the first determination processing (S13, S14), the curvature level is determined in consideration of the ocular axial length and the scan length. For example, regarding the ocular axial length, a threshold for determining it as the long ocular axial length indicating that the fundus is assumed to be greatly curved is compared with the ocular axial length of the examinee's eye acquired in the processing in S12 (S13). For example, 28 mm is set as a threshold. When the ocular axial length of the examinee's eye is less than the threshold (S13: No), the process proceeds to the second determination processing (S15, S16).

In contrast, when the ocular axial length of the examinee's eye is less than the threshold (S13: Yes), it is determined whether or not the scan length set in the processing in S3 is equal to or greater than the threshold (in this case, for example, 9 mm) (S14). Here, even if the fundus itself is greatly curved due to the long ocular axial length, if the scan length is sufficiently short, the influence of the curvature (height difference) on the fundus image is small, whereas as the scan length is longer, the influence of the curvature (height difference) on the fundus image becomes larger. The threshold may be a scan length that starts to pose a problem in the accuracy of the OCT data between each depth position where the fundus image exists in a case where the eye has a long ocular axial length with the fundus being greatly curved as compared with the normal eye. This threshold may be empirically obtained by an experiment or the like.

When the scan length is equal to or longer than the threshold (S14: No), the controller 70 optimizes various conditions assuming that the curvature level is the second level (S18). In the present example, the optical path length is adjusted such that the zero delay position Z is located on the shallower layer side than the retinal surface in the central region of the fundus image. In addition, the focus position may be adjusted so as to maximize the contrast of the region on the retinal surface side in the fundus image. At the same time, the polariser may be driven so as to maximize the interference sensitivity in the region of the fundus image which is located on the retinal surface side. In a case where the curvature level is the second level (the curvature is relatively large), these adjustments make it easier to acquire (photograph) the OCT data in which the peripheral side is brighter. Therefore, in a case where the fundus peripheral portion is photographed, it is easier to satisfactorily observe the lesion in the peripheral portion. In addition, the eye with a long ocular axial length allows easy acquisition of bright OCT data as a whole due to the influence of thinning of the central portion.

In contrast, when the scan length is less than the threshold (S14: No), the process proceeds to the second determination processing (S15, S16).

In the second determination processing (S15, S16), the curvature level is determined in consideration of the view angle and the scan range.

In this case, first of all, it is determined whether the view angle of the OCT optical system 100 is the first view angle or the second view angle (S15). In the case of the second view angle, a wide-angle region including the fundus central portion and the fundus peripheral portion can be scanned. In particular, in a case where the fundus peripheral portion is scanned, a problem can occurs in the accuracy of the OCT data between each depth position where the fundus image is present. Accordingly, in the present example, when the view angle is the second view angle (S15: Yes), it is determined whether or not the scan range set in the processing in S3 includes the fundus peripheral portion (S16). In a case where the fundus peripheral portion is included in the scan range (S16: Yes), the controller 70 optimizes various conditions assuming that the curvature level is the second level (S18).

In the process in S 14, when the view angle is the first view angle (S14: Yes), it is considered that the curvature of the fundus image is small in the entire photographing range. In this case, the controller 70 optimizes various conditions assuming that the curvature level is the first level (S17). In addition, even in a case where the view angle is the second view angle (S14: No), and also in a case where the scan range set in the processing in S3 is only the fundus central portion (S16: No), the controller 70 optimizes various conditions assuming that the curvature level is the first level (S17).

In this case, in the present example, the optical path length is adjusted such that the zero delay position Z is located on the deeper layer side than the choroid in the center region of the fundus image. In addition, the focus position may be adjusted so as to maximize the contrast of the region on the choroid side in the fundus image. At the same time, the polariser may be driven so as to maximize the interference sensitivity in the region of the fundus image which is located on the choroid side. When the curvature level is the first level (relatively small curvature), these adjustments facilitate obtaining (photographing) generally bright OCT data.

<Photographing Processing>

Referring back to the flowchart of FIG. 5, the description will be continued. In the present example, after optimization control (S4), photographing processing is executed (S5). As a result, the OCT data (tomographic image) in which a high accuracy region is set at a depth position corresponding to the curvature level is photographed as a photographed image. The photographed image is stored in the memory 72. Alternatively, the image may be displayed on the confirmation screen.

Furthermore, information regarding the depth position of the high accuracy region in the photographed OCT data may also be stored in the memory 72. This information may be, for example, a parameter for each adjuster (for example, at least one of the optical path length adjuster, the focus adjuster, and the polarization adjuster) regarding the position of a depth region at the time of photographing. This information may be stored in association with the identification information of the subject. In a case where re-photographing (follow-up photographing) is performed at a later date, the controller 70 may perform photographing upon reproducing the adjustment state of each adjuster on the basis of the above information. In this case, since the adjustment state of each adjuster remains the same for each photographing operation, it is easy to appropriately compare the OCT data photographed on different days.

In addition, at the time of follow-up photographing, it is conceivable that eye characteristics such as an ocular axial length and a refraction error of the examinee's eye have changed from those at the time of the previous photographing. In this case, a change in curvature level may be estimated in accordance with the change amount of an eye characteristic, and then the depth position of the high accuracy region may be adjusted in accordance with the estimated curvature level.

"Modification"

Although the present disclosure has been described above based on the embodiment and the examples, the present disclosure is not necessarily limited to them.

For example, in the photographing processing in the above example, the controller 70 uniquely photographs OCT data in which a high accuracy region is set at the depth position corresponding to the curvature level. However, the present invention is not necessarily limited to this, and the position of the high accuracy region may be adjustable to a position according to the operation from the examiner before and after the optimization control (S4). For example, which one of the retina side and the choroid side is to be photographed with high sensitivity may be manually settable on the basis of an operation input. For example, every time the switch button 502 shown in FIG. 6 is selected, the depth position of the high accuracy region may be switched between the retina side and the choroid side.

Furthermore, by designating a region to be observed with high accuracy on an OCT image, the position of the high accuracy region may be changed with reference to the designated position. For example, in a case where the upper part is designated in the fundus image, the zero delay position Z may be moved to the front side of the retinal surface, whereas in a case where the lower part is designated, the zero delay position Z may be moved to the back side of the choroid.

Furthermore, for example, the embodiment using the device that photographs the OCT data of the fundus has been described above. However, the present invention is not necessarily limited to this, and the above technology can also be applied to a device that photographs the OCT data of the anterior segment. That is, in a case where a plurality of tissues are included in the photographing range, the tissue to be depicted with high accuracy may be automatically determined in accordance with the photographing setting.

In this case, for example, the position of the high accuracy region may be adjusted in accordance with various scan settings (photographing settings) such as the view angle and the scan pattern. Furthermore, the positions of the different high accuracy regions may be associated in advance for each region of the anterior segment (anterior corneal surface side, posterior corneal surface side, anterior lens surface side, posterior lens surface side, and the like.), and the position of the high accuracy region may be controlled by specifying the region to be photographed on the basis of the setting operation.

The invention claimed is:

1. An OCT device comprising:
an OCT optical system that includes a beam splitter for splitting a beam from an OCT light source into a measurement optical path and a reference optical path and an optical path length adjuster configured to change an optical path length of at least one of the measurement optical path and the reference optical path, the OCT optical system being configured to detect a spectral interference signal between measurement light guided to a fundus of an examinee's eye via the measurement optical path and reference light from the reference optical path;
a processor programmed to:
acquire ocular axial length information that is a measurement of an ocular axial length value of the examinee's eye,
acquire OCT data of the fundus by processing the spectral interference signal output from the OCT optical system; and
determine whether to set a zero delay position on a shallower layer side than a retina in a central region of the fundus of the examinee's eye or on a deeper layer side than a choroid in the central region of the examinee's eye based at least on a comparison of the measured ocular axial length information to a predetermined threshold, wherein the zero delay position is located where the optical path lengths of the measurement optical path and the reference optical path coincide with each other.

2. The OCT device according to claim 1, wherein the processor is further programmed to control and move a mechanism to optically change a view angle in the OCT optical system, and
wherein the processor is further programmed to determine whether to set the zero delay position at a position on the shallower layer side than the retina in the central region of the fundus of the examinee's eye or at a position on the deeper layer side than choroid in the central region of the examinee's eye based on both the ocular axial length information and the view angle.

3. The OCT device according to claim 1, wherein
the processor is further programmed to set the zero delay position at a position on the shallower layer side than the retina in the central region of the fundus of the examinee's eye when the ocular axial length is longer than the predetermined threshold, and set the zero delay position at a position on the deeper layer side than the choroid in the central region of the examinee's eye when the ocular axial length is shorter than the predetermined threshold.

4. An OCT method comprising:
controlling an OCT optical system that includes a beam splitter to split a beam from an OCT light source into a measurement optical path and a reference optical path, change an optical path length of at least one of the measurement optical path and the reference optical path, and detect a spectral interference signal between measurement light guided to a fundus of an examinee's eye via the measurement optical path and reference light from the reference optical path;
acquiring ocular axial length information that is a measurement of an ocular axial length value of the examinee's eye,
acquiring OCT data of the fundus by processing the spectral interference signal output from the OCT optical system; and
determining whether to set a zero delay position on a shallower layer side than a retina in a central region of the fundus of the examinee's eye or on a deeper layer side than a choroid in the central region of the examinee's eye based at least on a comparison of the measured ocular axial length information to a predetermined threshold, wherein the zero delay position is located where the optical path lengths of the measurement optical path and the reference optical path coincide with each other.

* * * * *